United States Patent [19]
Schneider

[11] Patent Number: 5,983,769
[45] Date of Patent: *Nov. 16, 1999

[54] APPARATUS FOR HIGH CAPACITY ROTARY CHEESE SHREDDING

[75] Inventor: Alan L. Schneider, Brookfield, Wis.

[73] Assignee: Cepco, Inc., Brookfield, Wis.

[*] Notice: This patent issued on a continued prosecution application filed under 37 CFR 1.53(d), and is subject to the twenty year patent term provisions of 35 U.S.C. 154(a)(2).

[21] Appl. No.: 08/855,894

[22] Filed: May 12, 1997

[51] Int. Cl.$^6$ ....................................... B26D 11/00
[52] U.S. Cl. .......................... 83/865; 83/356.3; 83/425.1; 83/435.16; 83/437.2; 83/592; 83/932; 241/92; 241/101.4; 241/273.2; 241/298
[58] Field of Search .................................. 241/92, 101.4, 241/282.1, 282.2, 273.2, 298; 83/865, 932, 356.3, 357, 356.1, 862, 591, 592, 425.1, 435.15–435.19, 437.1–437.6

[56] References Cited

U.S. PATENT DOCUMENTS

| | | | |
|---|---|---|---|
| 177,383 | 5/1876 | Dick, Jr. | 241/92 |
| 498,262 | 5/1893 | Hemesath . | |
| 658,218 | 9/1900 | McAllister | 241/298 |
| 1,668,286 | 5/1928 | Powell | 83/425.1 |
| 1,898,160 | 2/1933 | Aeschbach | 83/591 X |
| 1,980,885 | 11/1934 | Smith | 241/92 X |
| 2,004,367 | 6/1935 | Brown | 83/75 |
| 2,026,691 | 1/1936 | McArdle et al. . | |
| 2,825,371 | 3/1958 | Forman | 144/41 |
| 3,888,428 | 6/1975 | Tabernacki | 241/92 |
| 4,155,384 | 5/1979 | Svensson | 241/298 X |
| 4,190,208 | 2/1980 | Schaeffer et al. | 241/92 |
| 4,198,887 | 4/1980 | Williams, Jr. | 83/356.3 |
| 4,364,525 | 12/1982 | McClean | 241/92 |
| 4,367,667 | 1/1983 | Shibata | 83/356.3 |
| 4,368,657 | 1/1983 | Pellaton | 241/92 X |
| 4,369,680 | 1/1983 | Williams | 83/13 |
| 4,393,737 | 7/1983 | Shibata | 83/356.3 |
| 4,579,028 | 4/1986 | Neidhart | 83/356.3 X |
| 4,875,631 | 10/1989 | Bardos | 241/92 |
| 5,010,796 | 4/1991 | Mendenhall | 83/356.3 |
| 5,097,735 | 3/1992 | Mendenhall | 83/865 |

FOREIGN PATENT DOCUMENTS

| | | | |
|---|---|---|---|
| 80002397 | 11/1980 | WIPO | 83/356.1 |

*Primary Examiner*—Rinaldi I. Rada
*Assistant Examiner*—Charles Goodman
*Attorney, Agent, or Firm*—Whyte Hirschboeck Dudek S.C.; Timothy J. Ziolkowski

[57] ABSTRACT

An apparatus for shredding cheese is disclosed which is capable of producing relatively precise square cross-section cheese shreds of a desired length. The apparatus is capable of simultaneously shredding multiple cheese blocks for high capacity cheese shredding. The length of the cheese shreds can be altered as desired, as well as the width and height to produce cheese shreds having a rectangular cross-section. A containment center is used to feed the blocks of cheese toward the cheese shredding apparatus. A series of horizontally mounted sectioning knives are at a front end of the containment center to section the cheese block into predefined lengths, thereby defining the length of each cheese shred. The cheese shredder includes multiple slicing and peeling assemblies mounted over a series of openings in a rotatable disk. Each slicing and peeling assembly includes a number of rakers having outwardly projecting slicing blades to vertically score a sectioned block of cheese. The slicing and peeling assemblies also includes a peeling knife arranged transversely to the slicing blades to peel the sectioned and scored cheese block. The individual cheese shreds are then fed through openings in the rotatable disk and fall into a discharge chute below.

26 Claims, 5 Drawing Sheets

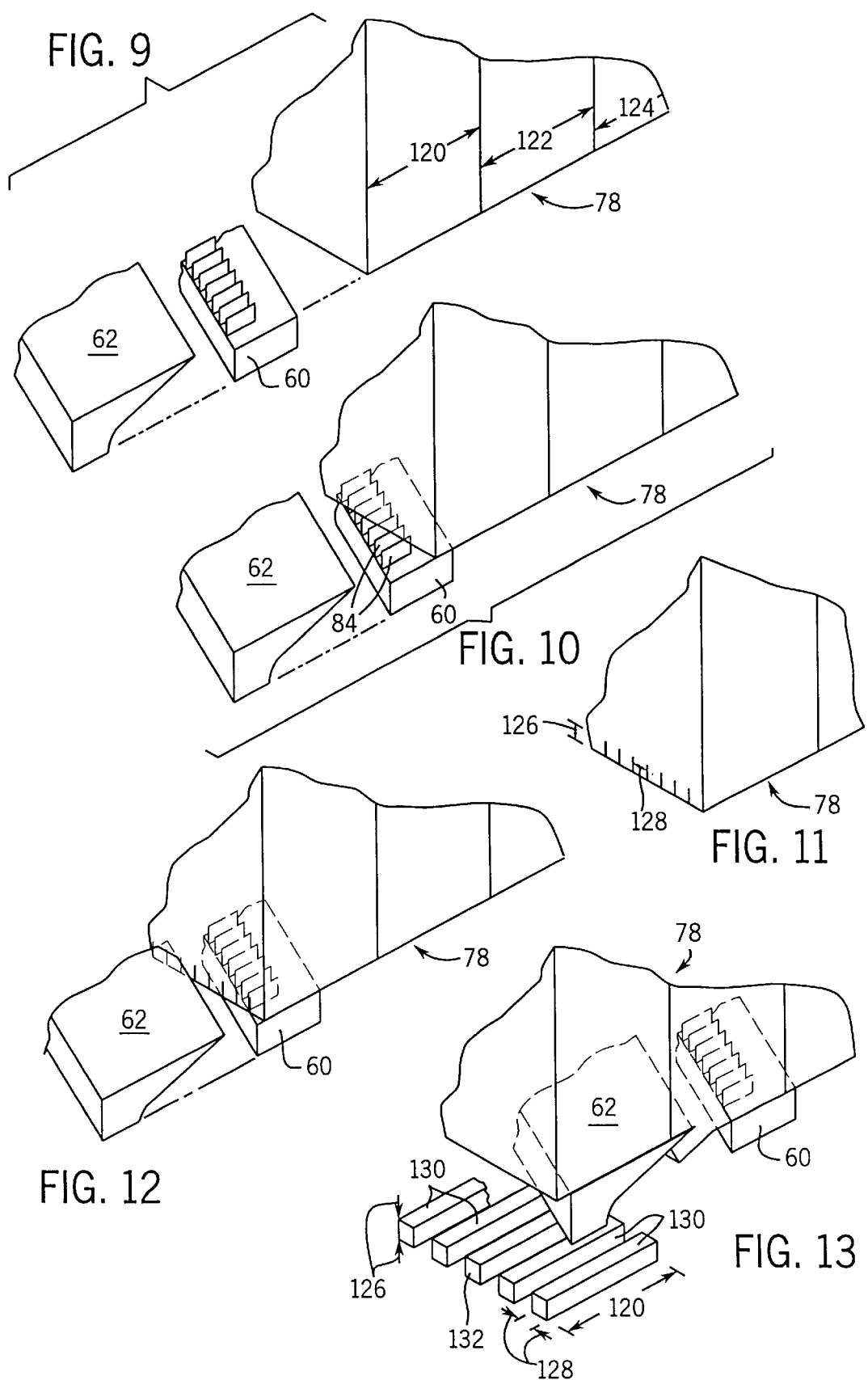

APPARATUS FOR HIGH CAPACITY ROTARY CHEESE SHREDDING

BACKGROUND OF THE INVENTION

The present invention relates generally to food processing, and more particularly, to a method and apparatus for high capacity cheese shredding.

There are several problems with prior art cheese shredding machines that have been unresolved to date. One particular problem is the type of cut produced. Purchasers of shredded cheese prefer shredded cheese with a square cross-section or a rectangular cross-section with clean, sharp corners and flat surfaces. However, the known prior art high capacity cheese shredders tend to produce shredded cheese with convex surfaces, and at a maximum rate of only 2500 lbs. per hour. A further limitation to these prior art devices is that they can only shred approximately a single ½ lb. block of cheese at a time.

Much of the prior art patents in this area are directed toward low capacity food processors typically constructed for home use. Such processors are small, light duty, typically only have a single cutting blade, and are not constructed to withstand high capacity production, nor meet USDA sanitary approval. For example, U.S. Pat. No. 4,198,887 shows a rotary food processing apparatus in which a cutting structure is spot welded to a rotating disk. Such retention methods allow for the accumulation of food materials and do not allow removal for cleaning. Further, such a device would not withstand heavy use because of the orientation and construction of the cutting structure.

Therefore, it would be desirable to have a method and apparatus for high capacity rotary cheese shredding that is capable of producing square cuts, shred multiple cheese blocks simultaneously, and meet USDA sanitary standards.

SUMMARY OF THE INVENTION

The present invention provides a cheese shredding apparatus that overcomes the aforementioned problems, and does so with a configuration that is capable of meeting USDA specifications.

A method of shredding cheese and a cheese shredding apparatus is disclosed which is capable of producing relatively precise square cross-section cheese shreds of a desired length. The apparatus is capable of simultaneously shredding multiple cheese blocks for a high capacity cheese shredding. The length of the cheese shreds can be altered as desired, as well as the width and height to produce cheese shreds having a rectangular cross-section having clean, sharp corners and shape.

The cheese shredder includes multiple slicing and peeling assemblies mounted over a series of openings in a rotatable disk. Each slicing and peeling assembly includes a number of rakers having outwardly projecting slicing blades to vertically score a sectioned block of cheese. The slicing and peeling assemblies also include a peeling knife arranged transversely to the slicing blades to slice the sectioned and scored cheese block. The peeling knives are parallel to the rotatable disk and peel the individual cheese shreds from the cheese block which are then fed through openings in the rotatable disk and fall into a discharge chute below.

A containment center is used to feed the blocks of cheese toward the cheese shredding apparatus. At the front end of the containment center, are a series of horizontally mounted sectioning knives to section a cheese block into predefined lengths, thereby defining the length of each cheese shred.

In accordance with one aspect of the invention, a cheese shredding apparatus is disclosed having at least one slicing and peeling assembly mounted over an opening in a rotatable disk. The slicing and peeling assembly has a number of rakers, each raker having a number of upwardly extending slicing blades that score one side of an incoming cheese block. The slicing and peeling assembly also has a peeling knife arranged transversely to the slicing blades. The peeling knife has a leading edge to peel the incoming cheese block after being scored by the slicing blades. The arrangement provides shredded cheese having a rectangular cross-section, preferably square.

In a preferred embodiment, the invention includes a pair of cheese block containment centers capable of feeding 40 lb. and larger cheese blocks into the cheese shredding apparatus. In order to initially section the cheese block so as to provide cheese shreds of a desired length, multiple horizontally mounted slicing knives are arranged at a front end of the containment center. The cheese blocks are fed through the horizontally mounted slicing knives and shredded according to the foregoing description. In this preferred embodiment, the rotatable disk is 33" in diameter and is equipped with three sets of 12" slicing and peeling assemblies which are capable of shredding cheese at the rate of 8–10,000 lbs. per hour—in some cases, 4 times more productive than current cheese shredding machines.

Another feature of the present invention is the removability of the slicing and peeling assemblies for cleaning. The retention method is free from protrusions, indentations, or slots which all provide areas for food accumulation. The form of retention includes a set of mounting bolts having a flat, planar head surface and a chamfered upper shoulder having a key formed in the chamfered shoulder. The mounting bolt fits in an opening of the rakers and knives that has a corresponding chamfer and a keyway such that each bolt is mounted flush with the slicing and peeling assembly to prevent an accumulation of waste product in or around the bolts.

Another feature of the present invention is that each of the slicing and peeling assemblies are comprised with multiple raker assemblies as opposed to one long raker. In the event of any one individual slicing blade breaking on an individual raker, only the single raker needs to be replaced. This is particularly advantageous in high capacity production where down time is critical and the likelihood of an ultimate failure is increased.

In accordance with another aspect of the invention, a method of forming shredded cheese is disclosed which includes initially slicing a block of cheese into sections which defines a desired cheese shred length and feeding the sectioned block of cheese toward engagement with a rotating disk. The method next includes scoring a side of the sectioned cheese block with a number of slicing blades, each blade having a height which defines a desired cheese shred height and each blade spaced apart to thereby define a desired cheese shred width. The method lastly includes peeling the scored, sectioned block of cheese at the desired cheese shred height to form shredded cheese having a desired length, width, and height.

Various other features, objects and advantages of the present invention will be made apparent from the following detailed description and the drawings.

BRIEF DESCRIPTION OF THE DRAWINGS

The drawings illustrate the best mode presently contemplated for carrying out the invention.

In the drawings:

FIGS. 9–13 are perspective views showing the steps of the present invention in which a block of cheese is cut into shredded portions that are substantially square in cross-section with consistent predetermined lengths.

DETAILED DESCRIPTION OF THE PREFERRED EMBODIMENT

Figure 1:
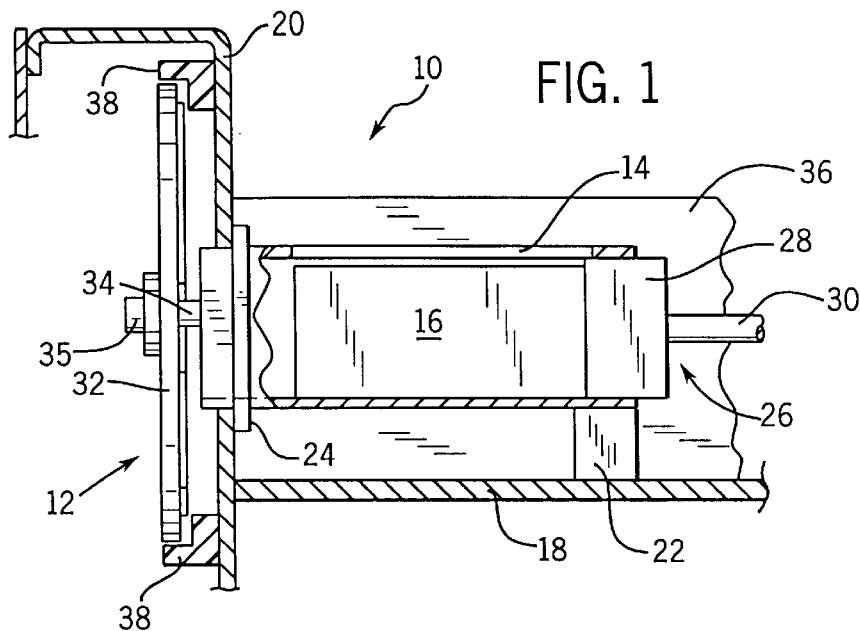
FIG. 1 is a sectional side elevation view of a cheese shredding machine according to the present invention with portions broken away.

Referring to FIG. 1, a high capacity cheese shredding machine 10 includes a cheese shredding apparatus 12 and at least one cheese block containment center 14. In a preferred embodiment, the high capacity cheese shredding machine 10 of the present invention includes a pair of cheese block containment centers for feeding a pair of cheese blocks 16 into the cheese shredding apparatus 12 simultaneously and discharging cheese shreds having a substantially rectangular cross-section of predetermined lengths consistently, as more thoroughly described with reference to FIGS. 9–13. In a preferred embodiment, the cheese shreds have square cross-section, but it will be readily apparent to those skilled in the art, that the cross-section, as well as the length, can be predetermined as desired. The present invention provides cheese shreds with planar sides overcoming the difficulties in the aforementioned prior art.

The cheese shredding machine 10 has a horizontal frame member 18 and a vertical frame member 20. A rear support 22 supports the containment center 14 on the horizontal frame member 18 and a forward support 24 maintains the stability of the containment center 14 within the vertical frame member 20. The cheese block containment center 14 includes a pushing device 26 for advancing a cheese block 16 toward the cheese shredding apparatus 12. The pushing device 26 includes a pusher block 28 and a shaft 30 which is connected to a driving device (not shown) for advancing cheese block 16 in the direction toward cheese shredding apparatus 12.

The cheese shredding apparatus 12 has a disk 32 rotatably connected to a drive shaft 34 extending into a drive mechanism housing 36. A plastic retainer 38 is situated between the vertical frame member 20 and disk 32. Disk 32 is held to drive shaft 34 with retaining nut 35.

Figure 2:
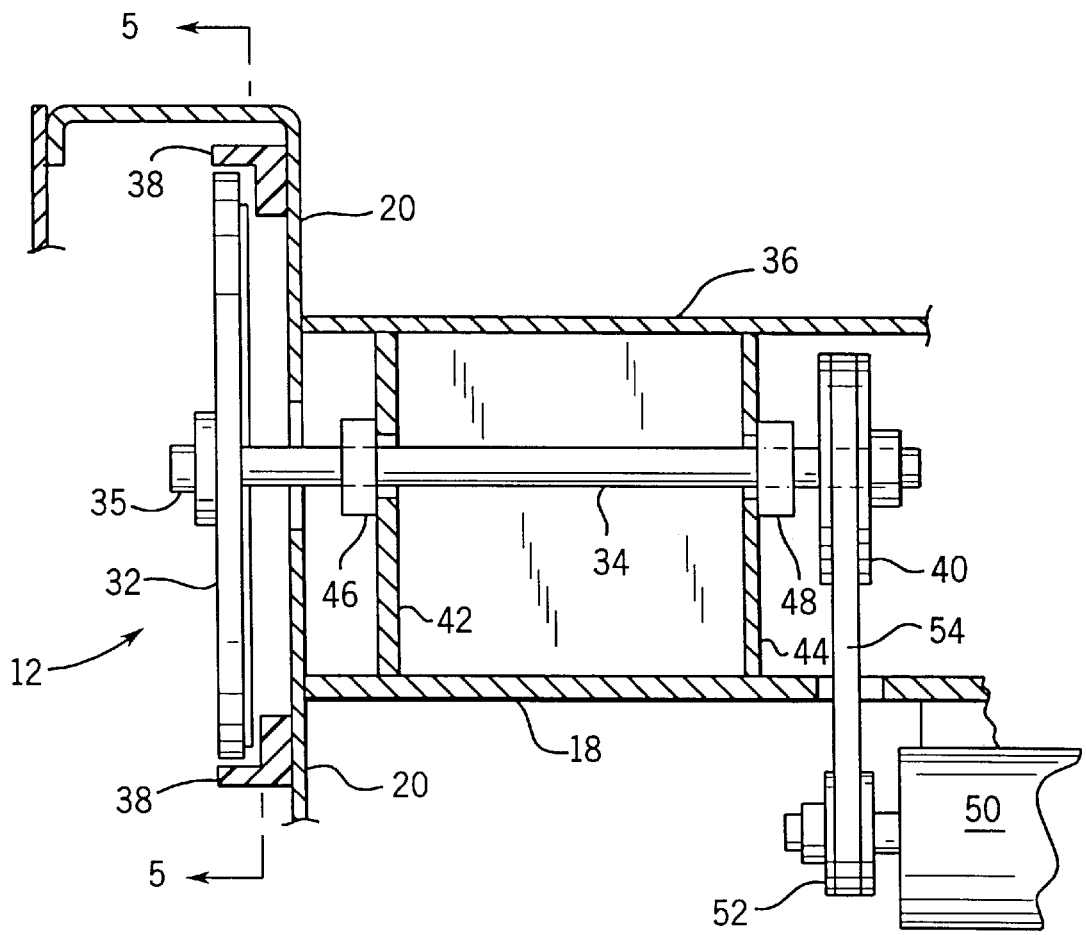
FIG. 2 is cross-sectional view of the apparatus of FIG. 1 showing the drive mechanism.

FIG. 2 shows a cross-sectional view of the drive mechanism housing 36 in which drive shaft 34 extends from disk 32 to a driven pulley 40. Housing 36 has a pair of vertical supports 42 and 44 which support drive shaft 34 by bearings 46 and 48 mounted in the vertical supports 42 and 44. The driven pulley 40 is driven by a motor 50 having a drive pulley 52 and a drive belt 54 between driven pulley 40 and drive pulley 52.

Figure 3:
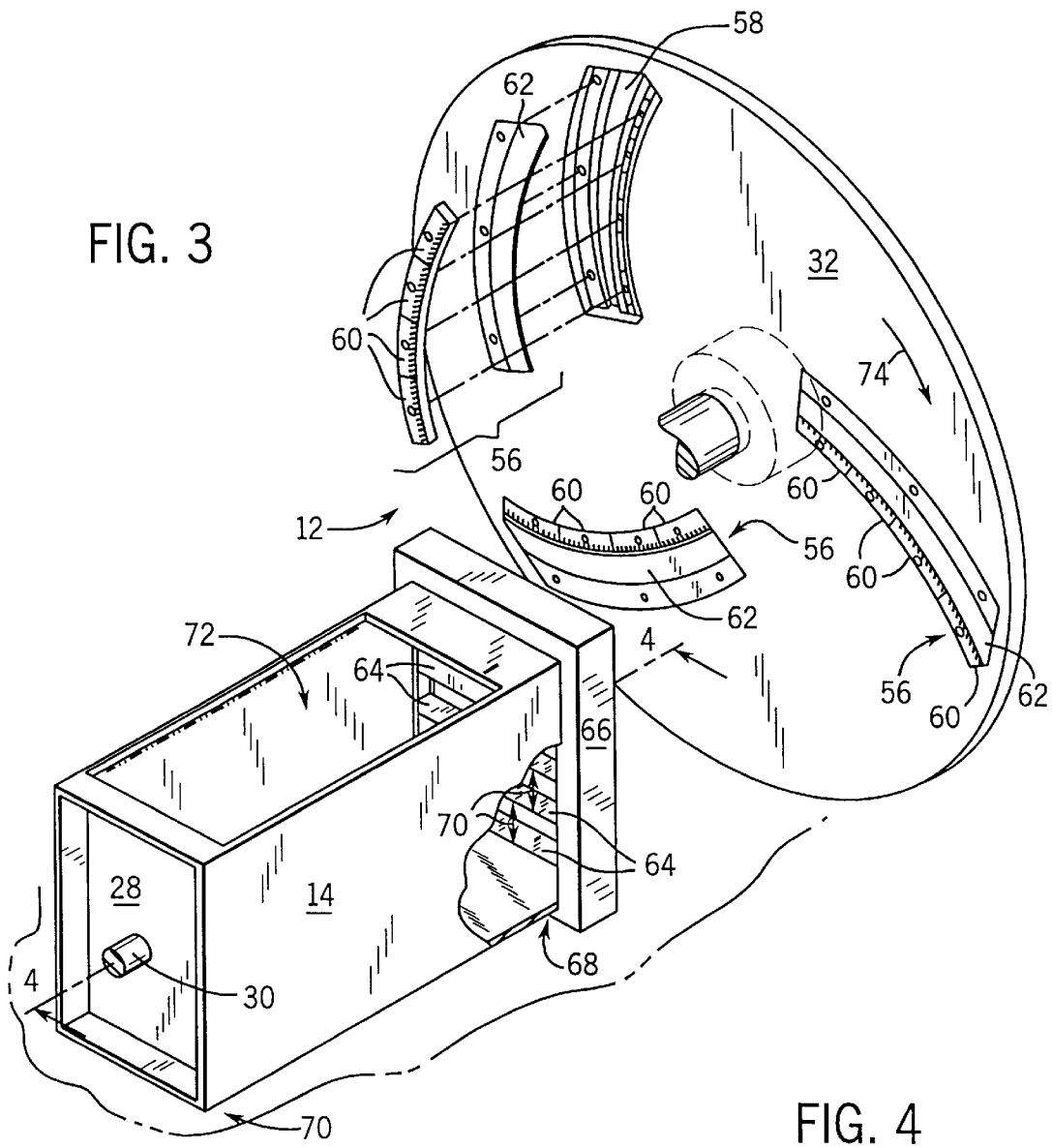
FIG. 3 is a partial perspective view of the apparatus of FIG. 1 with portions exploded.

FIG. 3 shows a perspective view of the cheese shredding apparatus 12 with a single cheese block containment center 14. The cheese shredding apparatus 12 has a plurality of slicing and peeling assemblies 56 mounted over openings 58 in disk 32. Each slicing and peeling assembly 56 has a plurality of rakers 60 and a peeling knife 62. Each of the slicing and peeling assemblies 56 are removably mounted to the disk 32 to accommodate easy cleaning of the cheese shredding apparatus 12 and quick replacement of any individual raker 60 or peeling knife 62 in the case of failure, or for sharpening, or for shredding different size shreds.

The cheese block containment center 14 has a plurality of horizontally arranged slicing knives 64 mounted in housing 66 which is attached at a front end 68 of cheese block containment center 14. The slicing knives 64 are equally spaced apart in a preferred embodiment. The spacing 70 defines the overall length of each cheese shred as will be apparent with reference to FIGS. 9–13. Preferably, the knives are equally spaced, to provide cheese shreds of consistent length, however, if it were desired to produce cheese shreds of differing lengths, the spacing between the horizontally mounted slicing knives 64 could be made unequal. As previously described, containment center 14 also has pusher block 28 connected to shaft 30 at a rear end 71 for advancing a cheese block placed within opening 72. The cheese block is then advanced through the horizontal knives 64 to horizontally slice the cheese block into sections, after which the sectioned cheese block is advanced into the cheese shredding apparatus 12 wherein each of the slicing and peeling assemblies slices and peels the sectioned block of cheese as the disk 32 rotates in a direction as shown by arrow 74.

Figure 4:
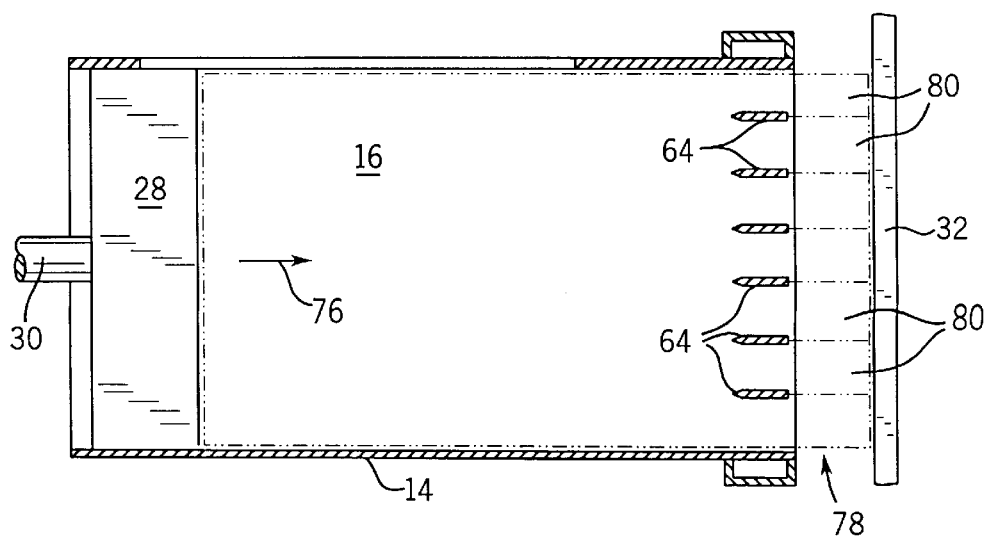
FIG. 4 is a side view of a portion of FIG. 3 taken along line 4—4.

Referring to FIG. 4, a cross-sectional view of containment center 14 shows pusher block 28 connected to shaft 30 advancing a cheese block 16 (shown in phantom) in a direction as indicated by arrow 76 through the horizontally mounted slicing knives 64 and towards the rotating disk 32. The sectioned cheese block 78 has a plurality of sections 80, each section defining an overall length of a cheese shred, as will be understood with reference to FIGS. 9–13.

Figure 5:
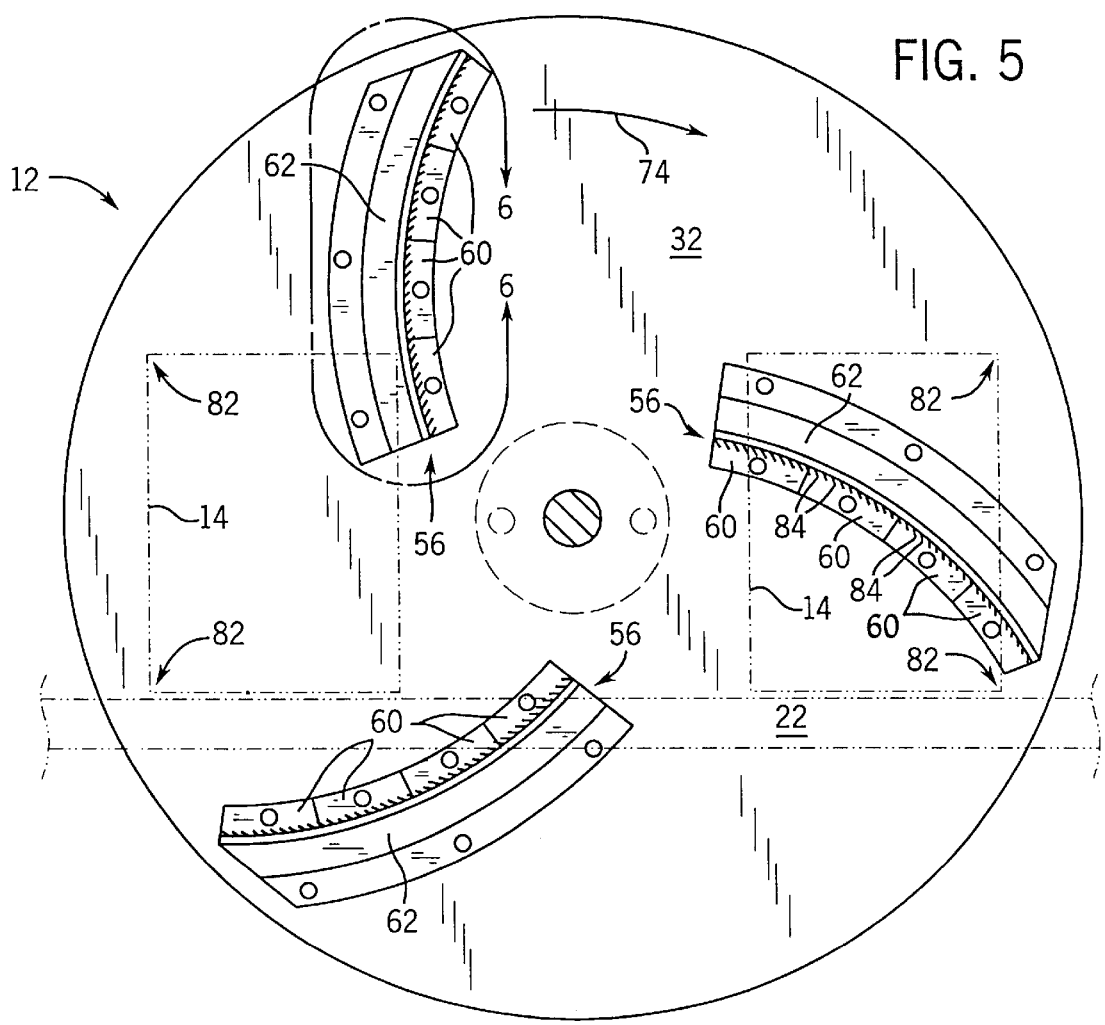
FIG. 5 is a front view of a portion of FIG. 2 taken along line 5—5.

FIG. 5 shows a front view of the cheese shredding apparatus 12 along line 5—5 of FIG. 2. FIG. 5 shows the embodiment in which a pair of containment centers 14 (shown in phantom) each advance a block of cheese simultaneously into the cheese shredding apparatus 12. The containment centers 14 are mounted on a common support 22 and are each situated such that the slicing and peeling assemblies 56 are capable of engaging the outermost edges 82 of the cheese blocks. In this manner, there is virtually no waste. It is also apparent from FIG. 5 that the arcing configuration of each slicing and peeling assembly 56, along with the orientation of each individual blade 84 on each raker 60, that the cheese block 14 is sliced by the individual blades 84 vertically as the disk 32 rotates as shown by 74 to provide rectangular cross-sectioned cheese shreds with sharp, neat corners, and with little waste.

In the preferred embodiment, in order to achieve the high capacity output of the present invention and shred two 40 lb. blocks of cheese simultaneously, the disk 32 is approximately 33" in diameter and the slicing and peeling assemblies 56 are 12" in length. The motor 50, FIG. 2, is preferably in the 25 to 40 horsepower category. This arrangement has been tested to produce shredded cheese at the rate of 8,000–10,000 lbs. per hour.

Figure 6:
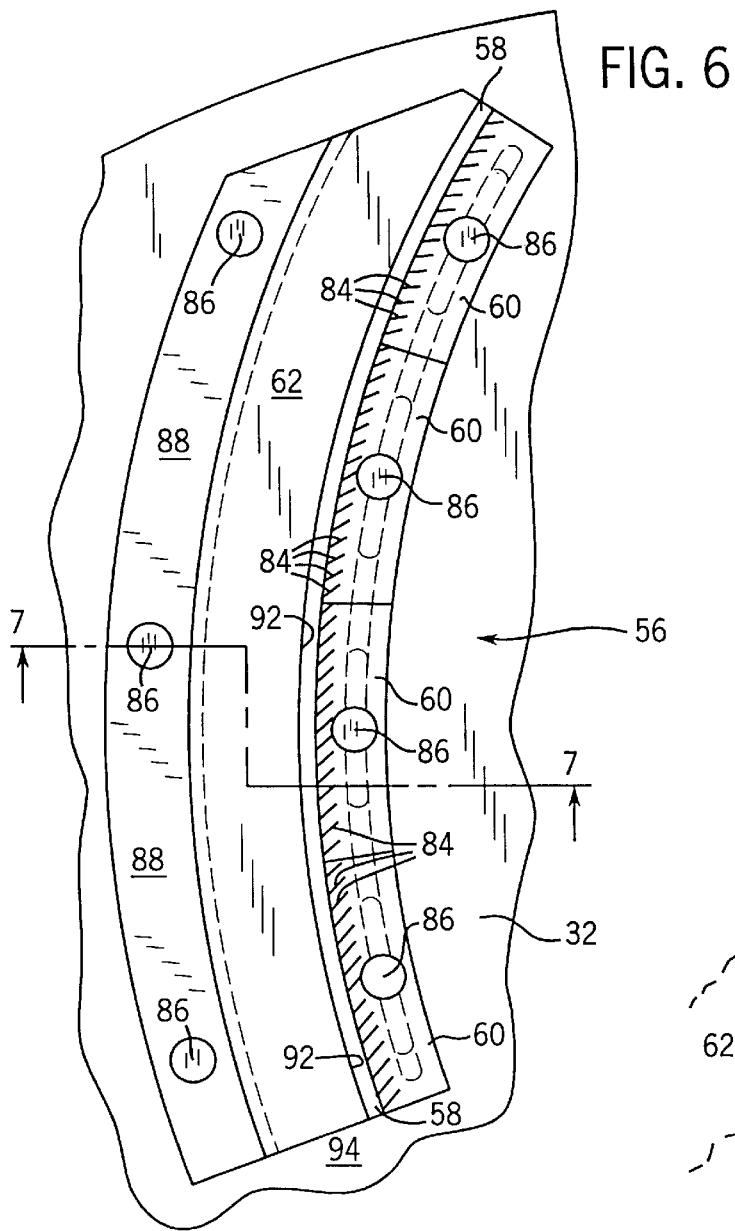
FIG. 6 is an enlarged detailed view of a portion of FIG. 5 taken along line 6—6.

Referring to FIG. 6, an enlarged view of a portion of FIG. 5, including a slicing and peeling assembly 56, is shown.

The peeling knife 62 is retained to the disk 32 with 3 mounting bolts 86. Each mounting bolt 86 is flush with a top surface 88 of peeling knife 62. Mounting bolts 86 also have slotless and planar heads with a chamfered shoulder 90, FIG. 7, to prevent the accumulation of any cheese in or around the mounting bolts. Referring back to FIG. 6, the peeling knife 62 has a leading cutting edge 92 and is substantially parallel with a mounting plane 94. The disk 32 has an opening 58 under peeling knife 62 for the cheese shreds to be discharged through.

Figure 7:
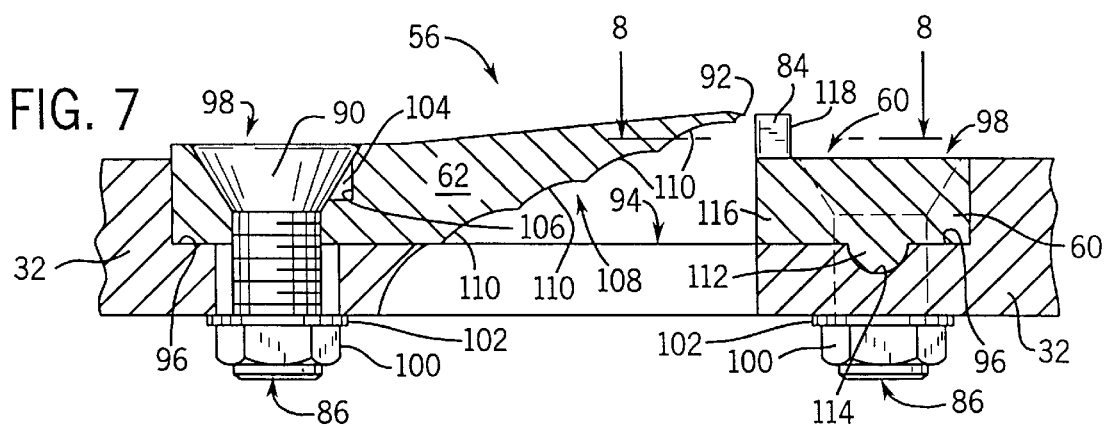
FIG. 7 is a cross-sectional view of a portion of FIG. 6 taken along line 7—7.

In this preferred embodiment, each slicing and peeling assembly 56 is equipped with 4 rakers 60, each having a plurality of individual slicing blades 84 extending upwardly from the mounting plane 94, as best shown in FIG. 7. The rakers 60 could alternately be manufactured in a single unitary piece. However, it has been found that it is more practical to manufacture the rakers in sections and bolt each individually to the disk 32 so that if one or two of the individual slicing blades 84 break, only one raker assembly needs to be replaced. Each raker 60 is held in place with a mounting bolt 86 mounted flush with the top surface of the raker.

FIG. 7 shows an enlarged cross-sectional view of the slicing and peeling assembly 56 mounted to the disk 32 taken along line 7—7 of FIG. 6. Peeling knife 62 is arranged substantially parallel to the mounting plane 94 and has a leading cutting edge 92 for peeling the sectioned and sliced cheese. Peeling knife 62 is retained in a recess 96 of disk 32 with mounting bolt 86. As previously mentioned, the mounting bolts 86 have planar caps 98 and are slotless to prevent the formation of cheese particles in and around the bolts. The bolts are held in place with retaining nuts 100 and washers 102. During assembly and disassembly, the bolts are held non-rotational by means of a key and keyway arrangement. Each bolt 86 is formed with a key 104 formed into the chamfered shoulder 90, and each of the peeling knives 62 and the rakers 60 are formed to have a corresponding keyway 106 to lock the slotless and flush mounting bolts non-rotational when tightening and loosening retaining nuts 100. Additionally, for strength the bolts are heat treated, as are the rakers and knifes and for cleanliness, they are made of stainless steel.

The underside 108 of the peeling knife 62 has a series of serrations 110 to prevent the cheese shreds from sticking to the blade. FIG. 7 also shows a raker 60 mounted to the disk 32 with mounting bolt 86 and retaining nut 100. The rakers 60 are mounted in the same recess 96 as the peeling knife 62. The rakers 60 have an additional aligning protrusion 112 engageable with a slot 114 in disk 32 to provide proper alignment during installation. The individual slicing blades 84 are preferably machined integrally with the mounting block 116 of the raker assembly 60. The slicing blades 84 also have a leading cutting edge 118 and are tapered during manufacture to provide greater strength. At the base, each is approximately 0.035" in thickness, whereas, near the top, each is approximately 0.015".

Figure 8:
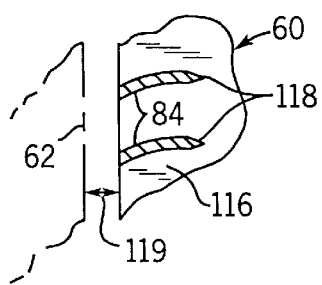
FIG. 8 is an enlarged detailed view of a portion of FIG. 7 taken along line 8—8.

FIG. 8 shows an enlarged detail of the slicing blades 84 taken along line 8—8 of FIG. 7. Peeling knife 62 is shown in phantom following the individual slicing blades 84 protruding from a mounting block 116 forming the rakers 60. Although not shown elsewhere for simplicity sake, the individual slicing blades 84 are, preferably, arced toward the center of the disk to accommodate cutting. It has also been found through experimentation that the gap 119 between the end of the rakers 60 and the beginning of the peeling knife 62 should be maintained at approximately 10–15 thousandths. This generally prevents the pliable cheese from deforming and therefore maintains a clean rectangular cross-sectional cut.

Referring to FIGS. 9–13, the method of the present invention is disclosed. FIG. 9 shows a sectioned cheese block 78, which has already been sectioned by the horizontally mounted slicing knives 64 in the containment center 14, is approaching a raker 60 followed by peeling knife 62. Each section 120, 122 and 124 each define a length of the resulting cheese shred. As shown in FIG. 10, the cheese is fed toward engagement with the rotating disk (not shown) and in engagement with raker 60 having the individual slicing blades 84 which score one side of each section of the sectioned cheese block 78.

FIG. 11 shows a partial view of a sectioned cheese block scored by the rakers 60 to form and define a desired cheese shred height 126 and the spacing between the individual slicing blades 84 define a desired cheese shred width 128. The sectioned and scored cheese block of FIG. 11 is then advanced into the peeling knife 62 in FIG. 12. As best shown in FIG. 13, the cheese shreds 130 are peeled from the block thereby forming shredded cheese having a desired length 120, a desired width 128, and a desired height 126.

As shown in FIGS. 9–13, where the height 126 of the individual slicing blades 84 is substantially equal to the spacing 128 between each of the individual slicing blades 84, the resulting cheese shred is formed with a substantially square cross-section 132. It is readily evident that by either modifying the height of the individual slicing blades 84 and/or the spacing width between the blades, various rectangular cross-sectional shapes can be formed for the shredded cheese. As previously set forth, the length of the cheese shreds are set according to the spacing of the horizontally mounted slicing knives 64 in the cheese block containment center 14.

The present invention has been described in terms of the preferred embodiment, and it is recognized that equivalents, alternatives, and modifications, aside from those expressly stated, are possible and within the scope of the appending claims.

I claim:

1. A cheese shredding apparatus comprising:

at least one slicing and peeling assembly having a plurality of slicing blades and a peeling knife, the plurality of slicing blades extending outwardly from a mounting plane, each slicing blade having a trailing edge and a leading cutting edge to slice an incoming cheese block in a first direction, and the peeling knife arranged substantially parallel to the mounting plane and substantially transversely to the plurality of slicing blades, the peeling knife having a concave leading edge having a length curved toward the incoming cheese block, the concave leading edge in such close proximity to the trailing edge of each slicing blade to immediately thereafter peel the incoming cheese block in a second direction, the second direction being substantially perpendicular to the first direction to thereby neatly separate and form a plurality of substantially rectangular shaped cheese shreds; and a rotatable disk having a substantially continuous planar top surface, the top surface having at least one discharge aperture located a distance from an outer edge of the rotatable disk such that the at least one discharge aperture is enclosed within the rotatable disk; and wherein the concave leading edge of the peeling knife, the slicing blades and the close proximity of the peeling knife leading edge to each of the slicing blade trailing edges prevent deformation of the incoming cheese block and the at least one slicing and peeling assembly is removably immediately mounted directly to the substantially continuous planer top surface of the rotatable disk and over the discharge aperture such that the incoming cheese block is first sliced by the slicing blades, then immediately peeled by the peeling knife to thereby create the substantially rectangular shaped cheese shreds that are dischargeable through the discharge aperture.

2. The cheese shredding apparatus of claim 1 further comprising a plurality of mounting bolts each having a chamfered shoulder and a slotless planar head retaining the at least one slicing and peeling assembly to the rotating disk such that the slotless planar heads are flush with the slicing and peeling assembly to prevent an accumulation of waste product therein.

3. The cheese shredding apparatus of claim 2 wherein the mounting bolts have a protruding key on the chamfered shoulder engageable with a corresponding keyway in the at least one slicing and peeling assembly.

4. The cheese shredding apparatus of claim 1 having three sets of slicing and peeling assemblies approximately equally spaced on the rotatable disk.

5. The cheese shredding apparatus of claim 1 further comprising a cheese block containment center to receive the cheese block therein having a pushing device to advance the cheese block through the cheese block containment center toward engagement with the rotatable disk.

6. The cheese shredding apparatus of claim 5 wherein the cheese block containment center has a plurality of slicing knives arranged across and mounted to a front end of the cheese block containment center to receive the cheese block therethrough, the slicing knives and spacing thereof defining a length of the cheese shreds formed.

7. The cheese shredding apparatus of claim 1 wherein the peeling knife has a series of serrations running a length of the peeling knife parallel to the leading edge.

8. The cheese shredding apparatus of claim 1 wherein each slicing blade is arced toward a center of the rotatable disk and extends perpendicularly from the mounting plane and each is rectangular shaped and wherein the leading cutting edge of each slicing blade is substantially perpendicular to the mounting plane.

9. The cheese shredding apparatus of claim 1 wherein each slicing blade is tapered having a narrow top portion and a wider base.

10. The cheese shredding apparatus of claim 1 further comprising at least one raker having the plurality of slicing blades extending outwardly from the raker.

11. The cheese shredding apparatus of claim 1 further comprising a plurality of rakers, each having the plurality of slicing blades extending outwardly therefrom.

12. The cheese shredding apparatus of claim 11 wherein each raker is retained to the rotatable disk with a flush mounted and slotless bolt having a key extending from an upper shoulder engageable with the raker.

13. The cheese shredding apparatus of claim 1 wherein the peeling knife is mounted at an acute angle to the mounting plane whereby the leading edge of the peeling knife is at a height, as measured from the rotatable disk, that is substantially equal to a height of the plurality of slicing blades, as measured from the rotatable disk.

14. The cheese shredding apparatus of claim 13 wherein the close proximity of the leading edge of the peeling knife to the plurality of slicing blades, in association with the substantially equal heights of the concave peeling knife and the plurality of slicing blades, provides the substantially rectangular shaped cheese shreds.

15. The cheese shredding apparatus of claim 1 wherein the slicing and peeling assembly is concave-shaped in a direction of rotation of the rotatable disk.

16. The cheese shredding apparatus of claim 1 wherein the plurality of slicing blades extend outwardly from a raker that is removably mounted to the rotatable disk, wherein each slicing blade is mounted at an angle to an elongated side of the raker such that as the rotatable disk rotates about a block of cheese, the plurality of slicing blades engage the incoming cheese block at right angles to provide straight cuts across the block of cheese.

17. The cheese shredding apparatus of claim 1 wherein the slicing and peeling assembly is concave-shaped in a direction of rotation of the rotatable disk, and wherein the slicing and peeling assembly is mounted diagonally on the rotatable disk with respect to a central axis of the rotatable disk.

18. The cheese shredding apparatus of claim 17 wherein the plurality of slicing blades extend outwardly from a raker that is removably mounted to the rotatable disk, wherein each slicing blade is mounted at an angle to an elongated side of the raker such that as the rotatable disk rotates about a block of cheese, the plurality of slicing blades engage the block of cheese at right angles to provide straight cuts across the block of cheese.

19. A high capacity cheese shredding machine comprising:

at least one slicing and peeling assembly having a plurality of slicing blades extending upwardly from a mounting plane, each slicing blade being arced toward a center of the rotatable disk and having a trailing edge and a leading cutting edge to slice at least one incoming cheese block in a first direction, the slicing and peeling assembly also having a peeling knife arranged substantially parallel to the mounting plane, the peeling knife having a concave leading edge and having a length curved toward the at least one incoming cheese block, the peeling knife concave leading edge being in such close proximity to the trailing edge of each slicing blade to immediately thereafter peel the at least one incoming cheese block in a second direction, the second direction being substantially perpendicular to the first direction to thereby form a plurality of substantially rectangular shaped cheese shreds;

a rotatable disk having a substantially continuous planar top surface, an outer perimeter, and a centrally located aperture to receive a rotatable shaft therein, the top surface having at least one discharge aperture located a distance between the outer perimeter and the centrally located aperture such that the discharge aperture is bounded by the rotatable disk, wherein the at least one slicing and peeling assembly is removably mounted directly to the top surface of the rotatable disk over the at least one discharge aperture such that the at least one incoming cheese block is first sliced by the slicing blades, then peeled by the peeling knife, and then discharged through the discharge aperture;

a pair of cheese block containment centers to each receive the at least one incoming cheese block therein and each having a pushing device to advance each cheese block through each cheese block containment center toward engagement with the rotatable disk; and wherein the concave leading edge of the peeling knife, the slicing blades and the close proximity of the peeling knife leading edge to each of the slicing blade trailing edges prevent deformation of the incoming cheese blocks and thereby provide the substantially rectangular shaped cheese shreds.

20. The high capacity cheese shredding machine of claim 19 wherein each cheese block containment center has a plurality of slicing knives arranged across and mounted to a front end of the cheese block containment center to receive the at least one incoming cheese block therethrough, the slicing knives and spacing thereof defining a length of the cheese shreds formed.

21. The cheese shredding apparatus of claim 19 wherein the peeling knife is mounted at an acute angle to the mounting plane whereby the leading edge of the peeling knife is at a height, as measured from the rotatable disk, that is substantially equal to a height of the plurality of slicing blades as measured from the rotatable disk.

22. The cheese shredding apparatus of claim 21 wherein the close proximity of the leading edge of the peeling knife to the plurality of slicing blades, in association with the substantially equal heights of the peeling knife and the plurality of slicing blades, provides well defined rectangular shaped cheese sheds.

23. The cheese shredding apparatus of claim 19 wherein the slicing and peeling assembly is concave-shaped in a direction of rotation of the rotatable disk.

24. The cheese shredding apparatus of claim 19 wherein the plurality of slicing blades extend upwardly from a raker that is removably mounted to the rotatable disk, wherein each slicing blade is mounted at an angle to an elongated side of the raker such that as the rotatable disk rotates about the at least one incoming cheese block, the plurality of slicing blades engage the at least one incoming block of cheese at right angles to provide straight cuts across the block of cheese.

25. The cheese shredding apparatus of claim 19 wherein the slicing and peeling assembly is concave-shaped in a direction of rotation of the rotatable disk, and wherein the slicing and peeling assembly is mounted diagonally on the rotatable disk with respect to a central axis of the rotatable disk.

26. The cheese shredding apparatus of claim 25 wherein the plurality of slicing blades extend upwardly from a raker that is removably mounted to the rotatable disk, wherein each slicing blade is mounted at an angle to an elongated side of the raker such that as the rotatable disk rotates about the at least one incoming cheese block, the plurality of slicing blades engage the at least one incoming block of cheese at right angles to provide straight cuts across the block of cheese.

* * * * *